Figure 4:
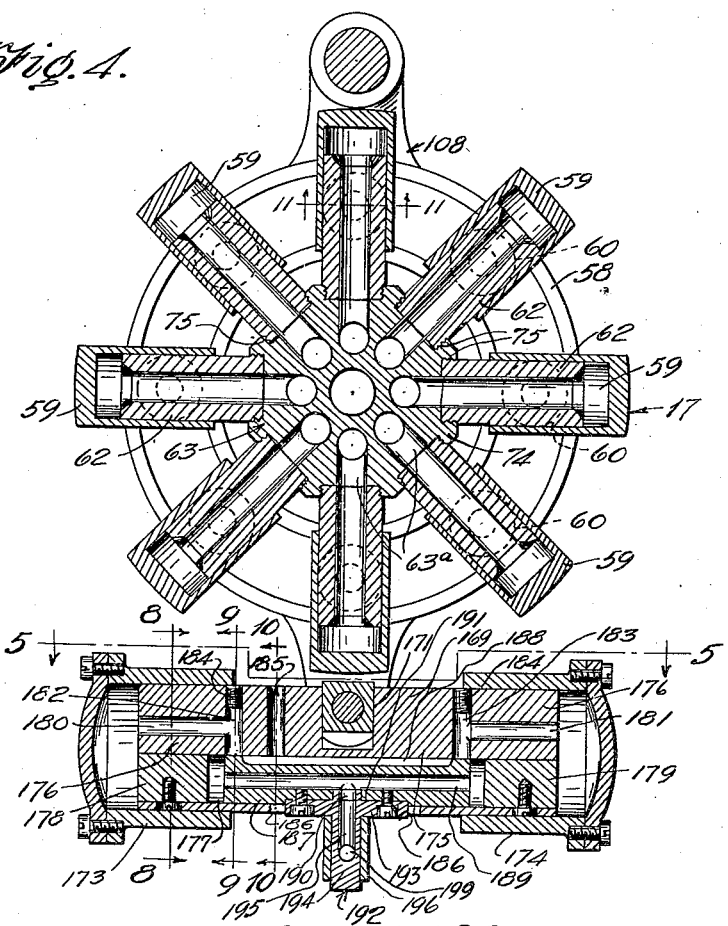

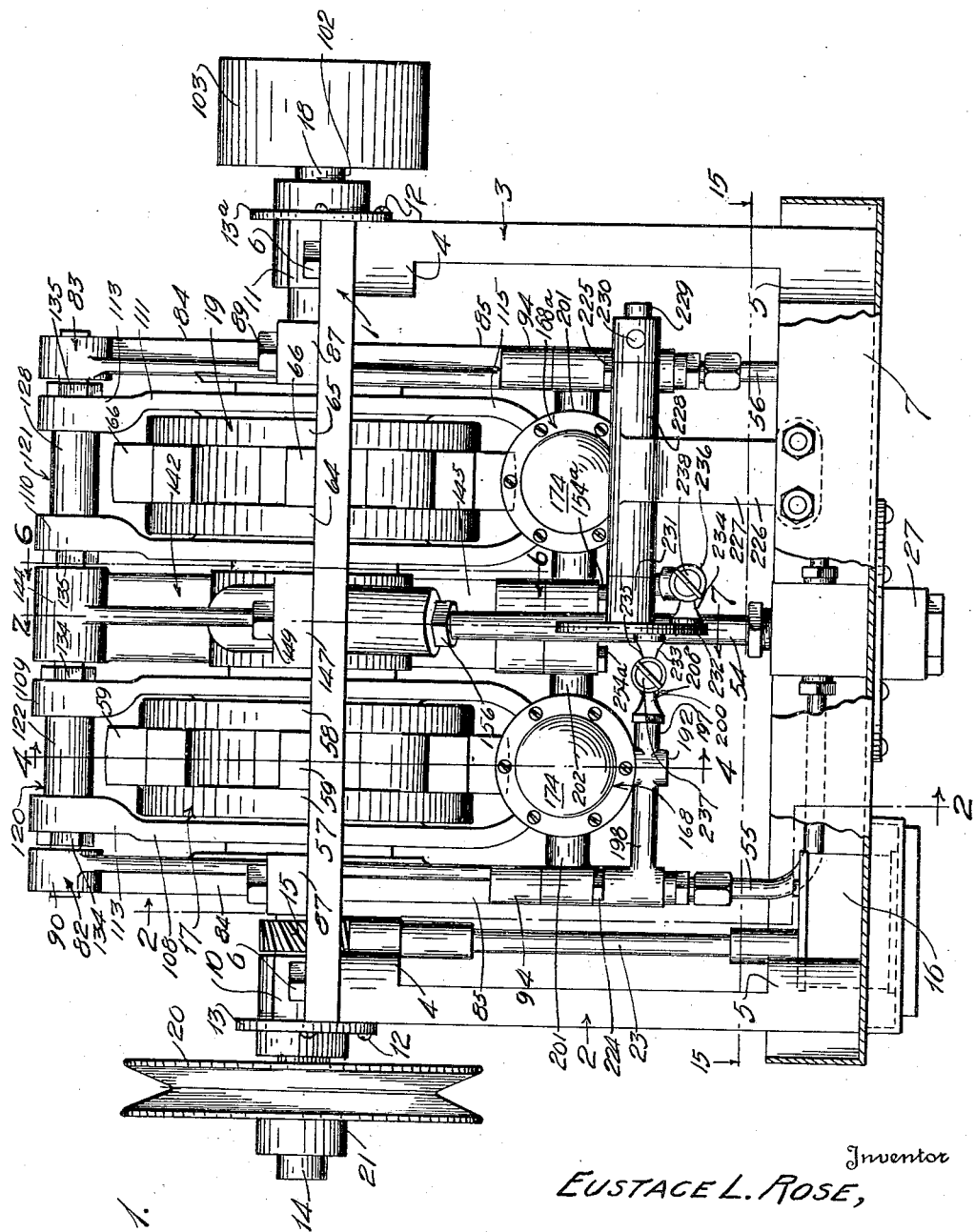

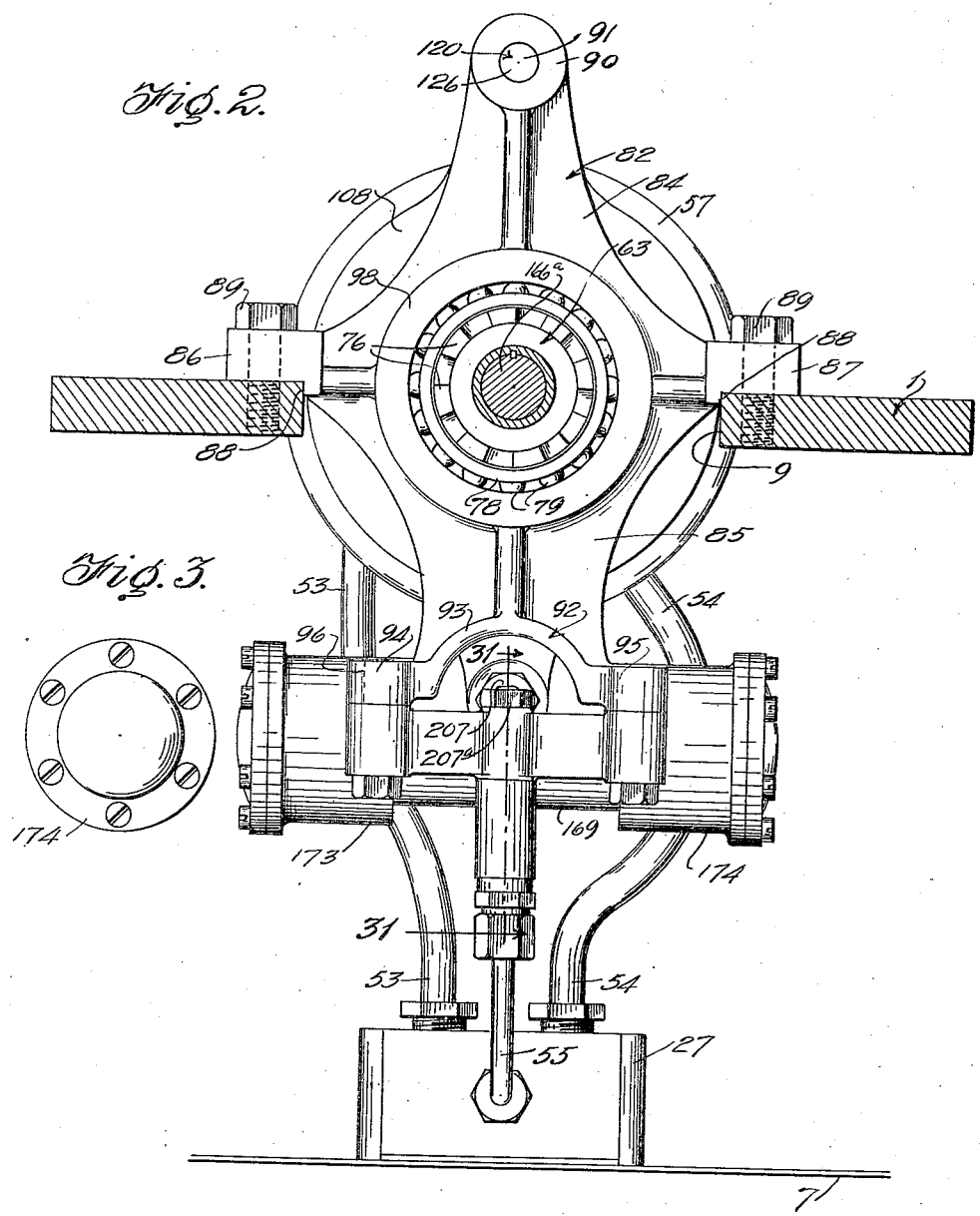

April 23, 1940.  E. L. ROSE  2,198,515

HYDRAULIC TRANSMISSION MECHANISM

Filed Sept. 28, 1937   11 Sheets-Sheet 3

Inventor
EUSTACE L. ROSE,
By Kimmel & Crowell
Attorneys.

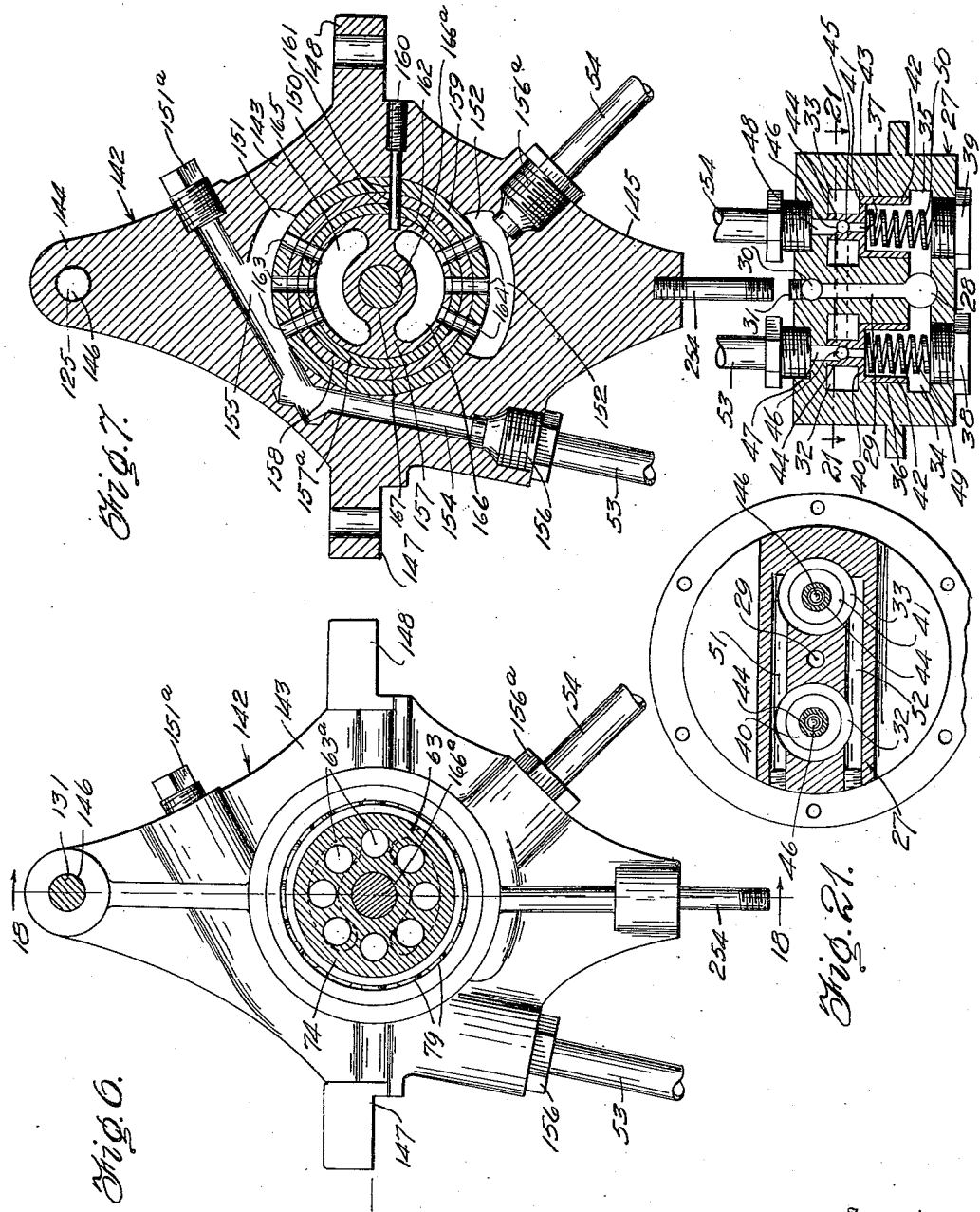

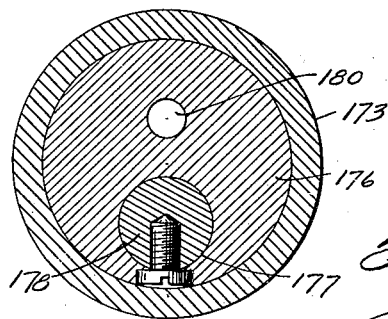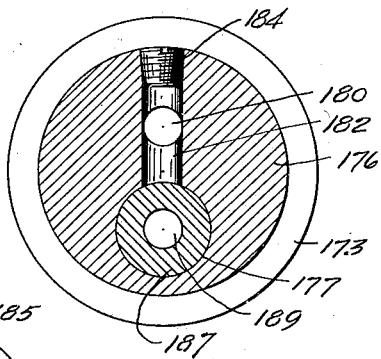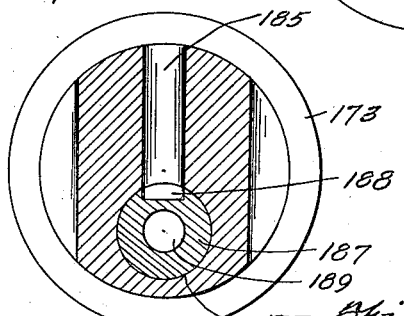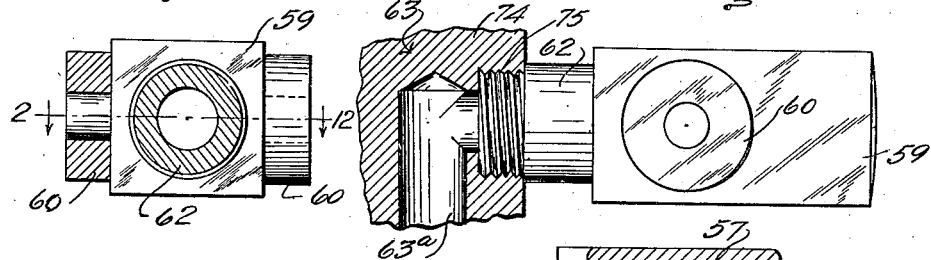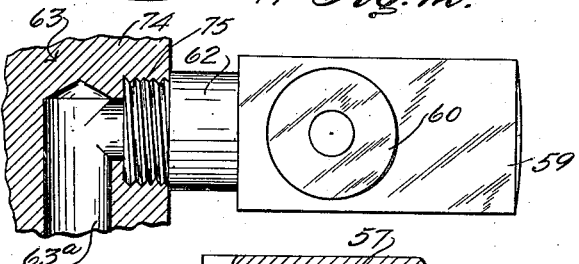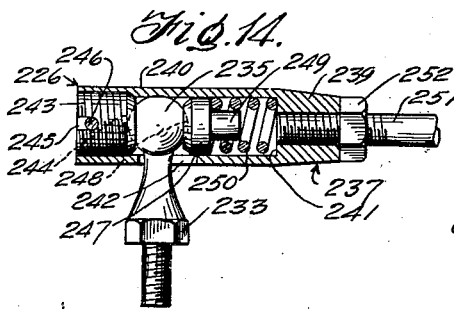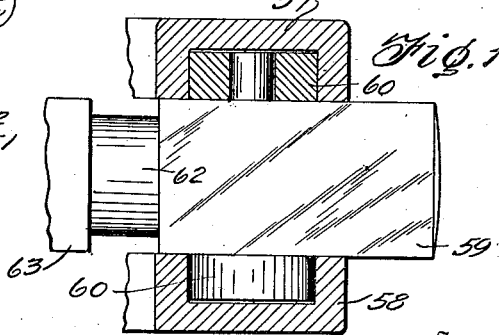

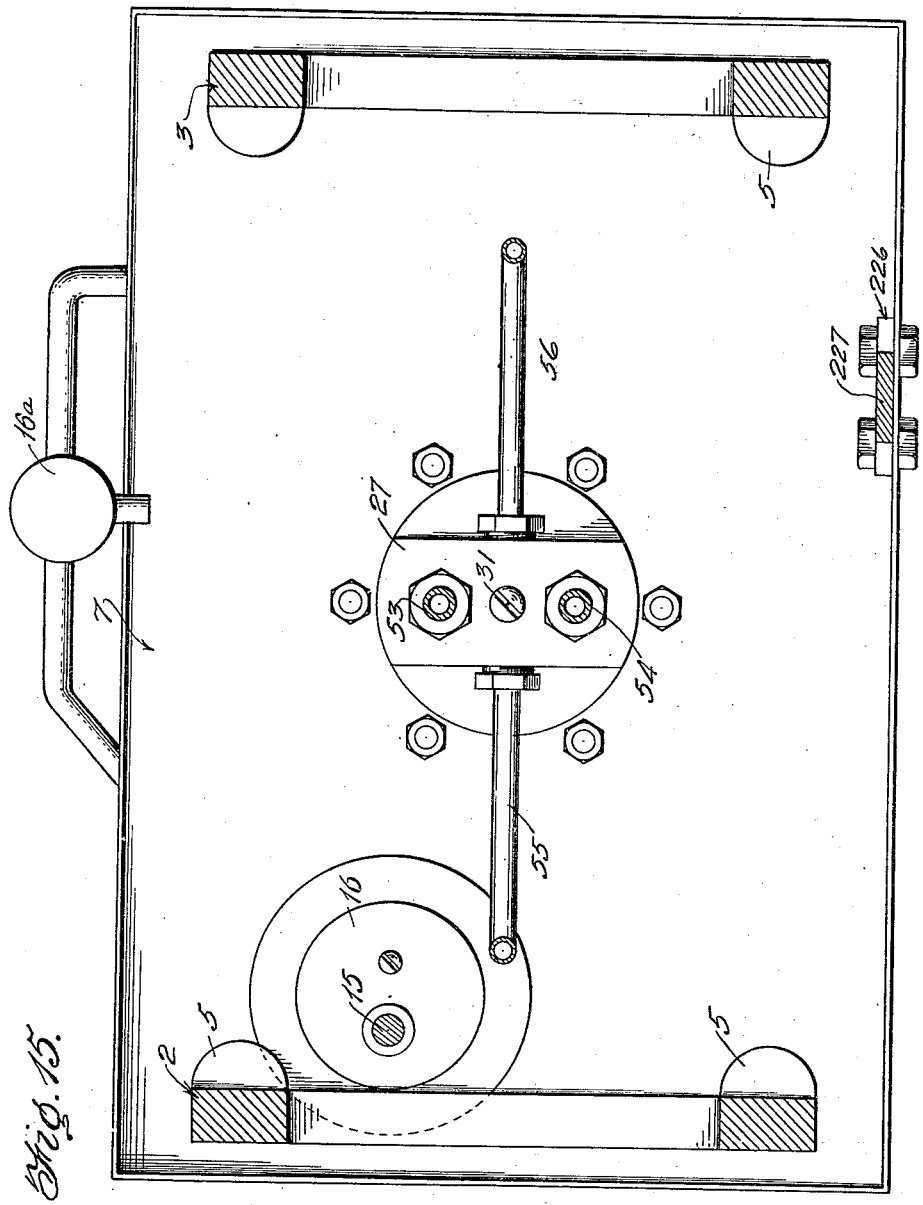

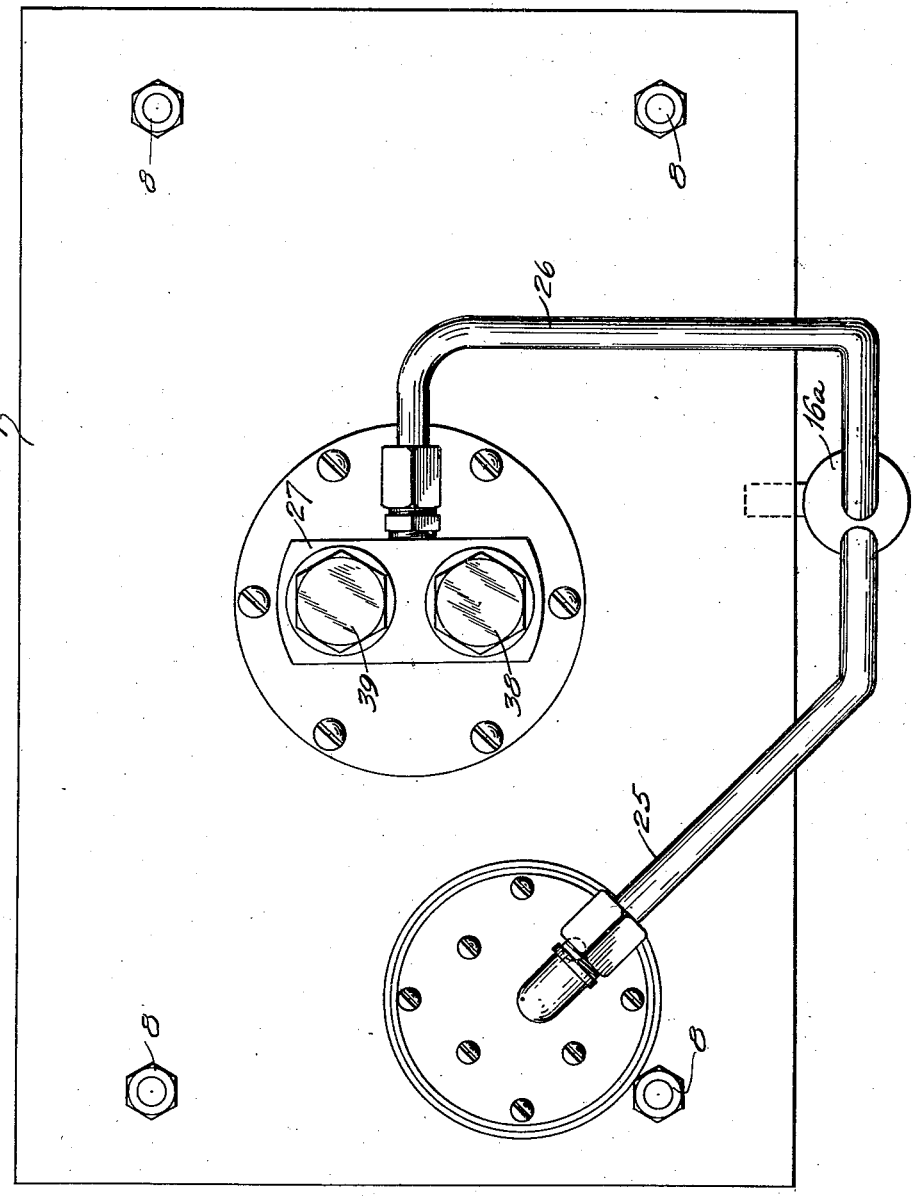

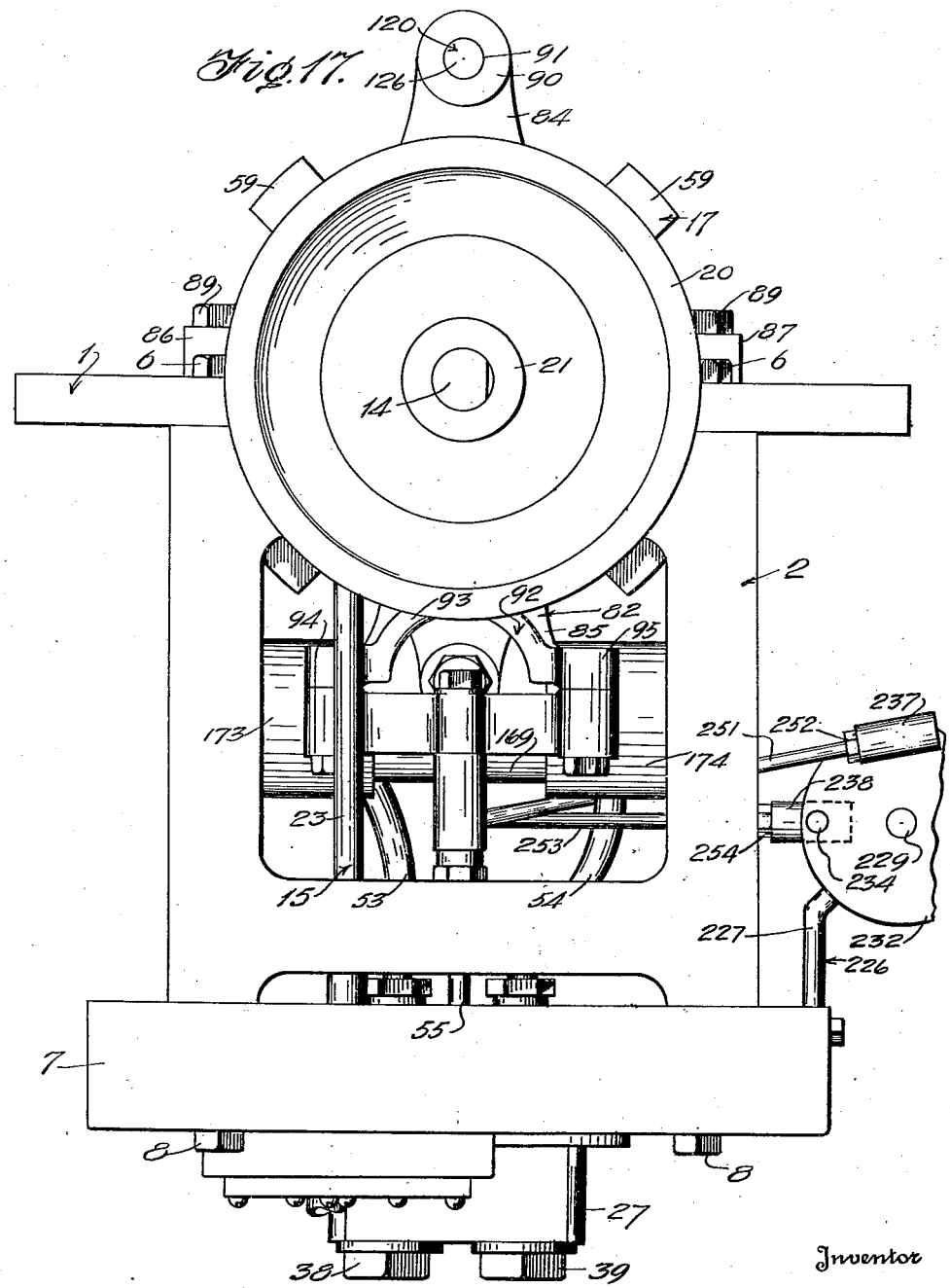

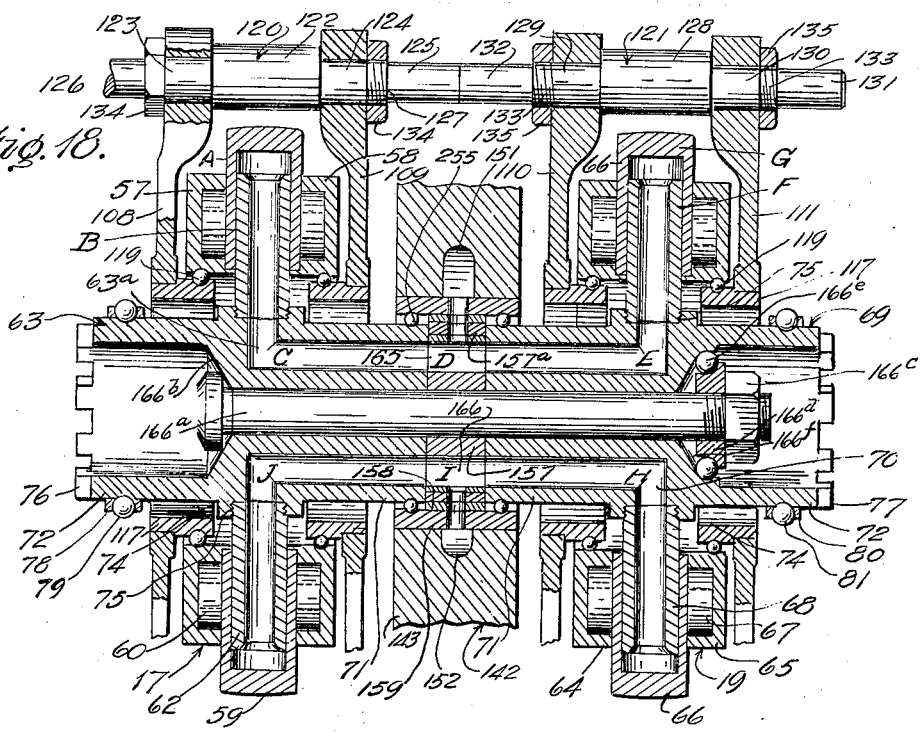

April 23, 1940.  E. L. ROSE  2,198,515
HYDRAULIC TRANSMISSION MECHANISM
Filed Sept. 28, 1937  11 Sheets-Sheet 10
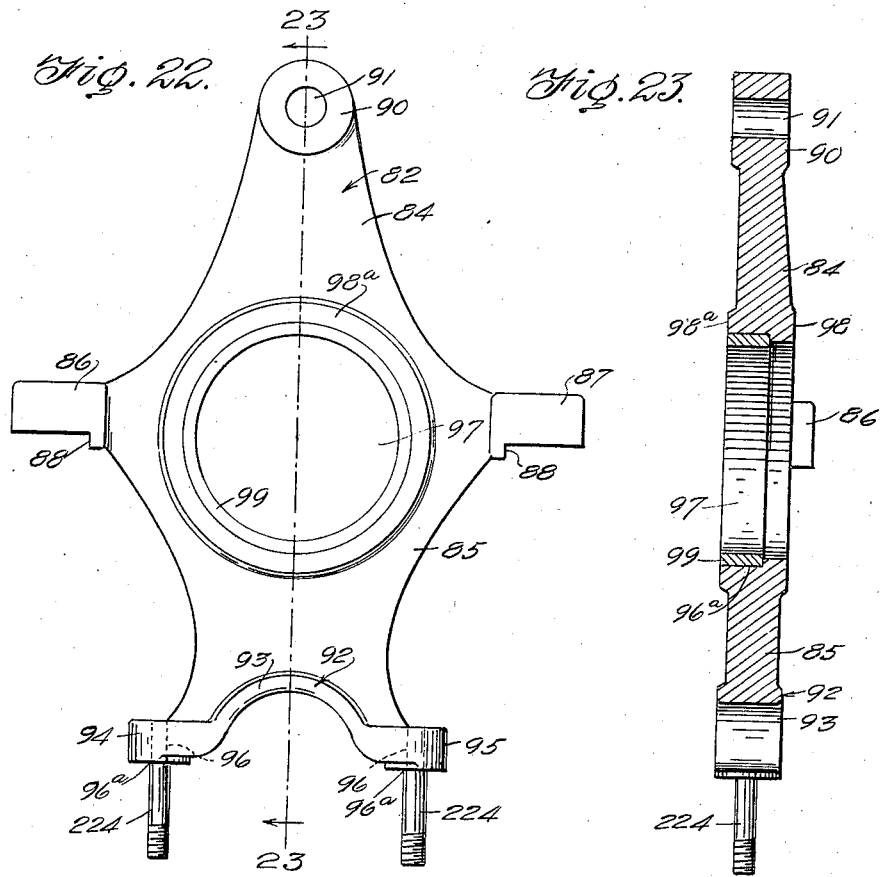
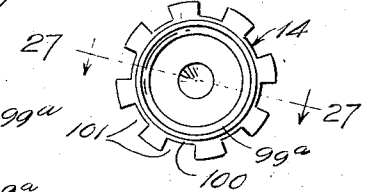
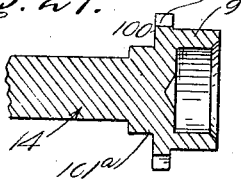
Inventor
EUSTACE L. ROSE,
By Kimmel & Crowell
Attorneys

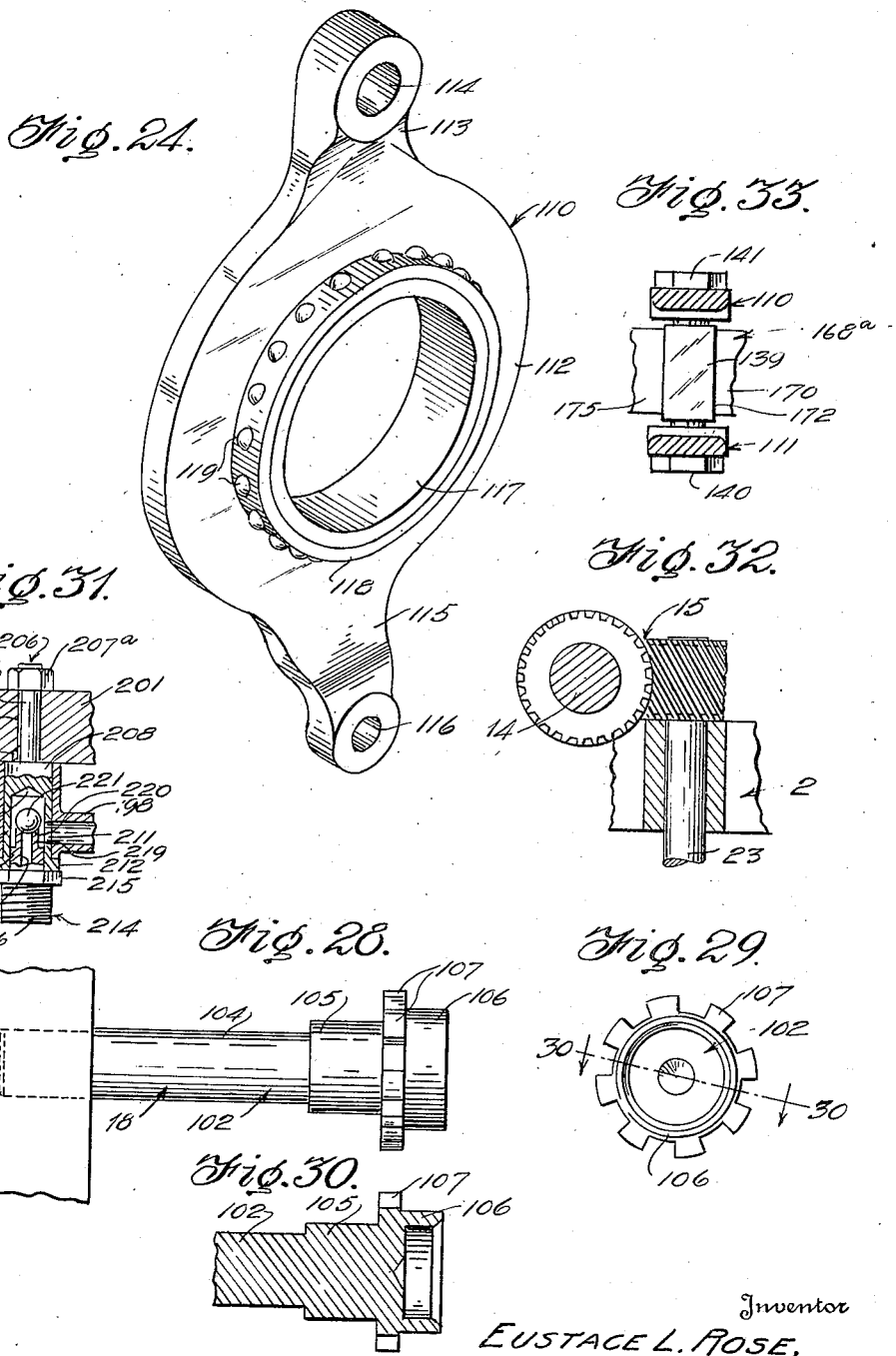

Patented Apr. 23, 1940

2,198,515

UNITED STATES PATENT OFFICE 2,198,515

HYDRAULIC TRANSMISSION MECHANISM

Eustace Loring Rose, Charleston, W. Va.

Application September 28, 1937, Serial No. 166,174

5 Claims. (Cl. 60—53)

This invention relates to a hydraulic transmission mechanism and has for its object to provide, in a manner as hereinafter set forth, a mechanism of such class for transmitting motion from a prime mover to a driven element capable of being controlled to operate at any desired speed and in any desired direction.

The invention further aims to provide, in a manner as hereinafter set forth, a hydraulic transmission mechanism which eliminates the use of pintle bearings; whereby all heavy loads may be carried on anti-friction bearings; whereby it requires a very small quantity of hydraulic fluid for operation and will not unduly heat; whereby thrust adjustment passes through the center of the temperature generating zone and will be equally affected by temperature changes along with the parts it is holding to contact, thereby maintaining proper running conditions regardless of temperature changes; and whereby overload is automatically controlled to prevent impairment of any of the parts thereof.

The invention further aims to provide, in a manner as hereinafter set forth, a mechanism of the class referred to having its parts so related to give a smooth and infinitely variable effect and at the same time provide in a single mechanism the functions of a clutch and change speed gear effect whilst eliminating their undesirable features.

A further object of the invention resides in the employment of a stationary highly efficient and free running fluid transfer element or valve mounted on a stationary support and which has no frictional loads imposed on it from fluid pressures, and in which the running clearances are not materially affected by temperature changes in its, or its associated parts, and in which the clearance may be easily adjusted for wear or different fluid viscosities.

Another object of the invention is to provide an improved form of cylinder which allows a more compact and a more open construction for heat dissipation.

Another object of the invention is to provide an auxiliary by-pass channel with an overload valve that will greatly reduce the initial fluid pressure when circulating therein, thus preventing any undue temperature rise in the fluid.

A still further object of the invention is to place a power intensifier in the stroke control mechanism to reduce the efforts of the operator in manipulating the control.

A still further object of the invention is to provide a variable speed gear which is easy to control and remains unusually cool in operation.

Further objects of the invention are to provide, in a manner as hereinafter set forth, a hydraulic transmission mechanism which is comparatively simple in its construction and arrangement, strong, durable, compact, smoothly operating, thoroughly efficient in its use, readily assembled, capable of being conveniently repaired when occasion requires, and comparatively inexpensive to set up.

To the above ends essentially and to others which may be hereinafter referred to, the invention consists of the novel construction, combination and arrangement of parts as will be more specifically referred to and are illustrated in the accompanying drawings wherein is shown an embodiment of the invention, but it is to be understood that changes, variations and modifications may be resorted to which fall within the scope of the invention as claimed.

Figure 5:
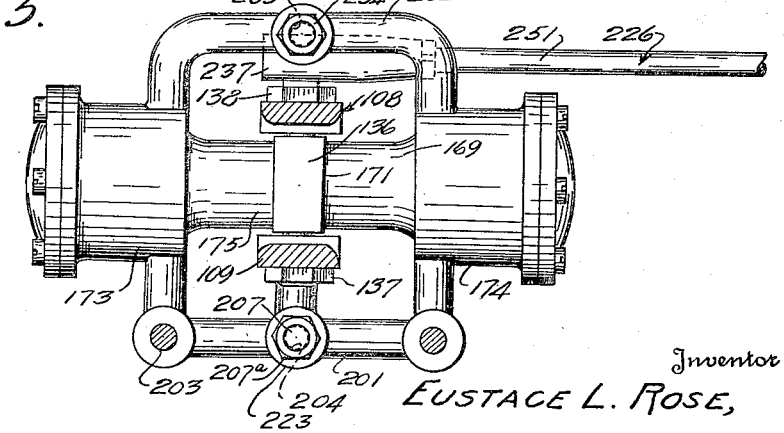

In the drawings:

Figure 1 is a front elevation broken away for the purpose of showing rear parts of the transmission, Figure 2 is a fragmentary sectional view on line 2—2, Figure 1, Figure 3 is a detail view in elevation looking towards one of the ends of the cylinder for housing the shifting piston for the pump or the motor element, Figure 4 is a section on line 4—4, Figure 1, Figure 5 is a section on line 5—5, Figure 4, Figure 6 is a fragmentary section on line 6—6, Figure 1, Figure 7 is a fragmentary section, broken away, on line 7—7, Figure 1, Figure 8 is an enlarged detail section on line 8—8, Figure 4, Figure 9 is an enlarged detail section on line 9—9, Figure 4, Figure 10 is an enlarged detail section on line 10—10, Figure 4, Figure 11 is an enlarged detail section on line 11—11, Figure 4, Figure 12 is a fragmentary section upon an enlarged scale on the line 12—12, Figure 11, Figure 13 is a view of the structure shown in Figure 12 partly in front elevation and partly in section, Figure 14 is a longitudinal sectional view illustrating the form of connection employed for the control rods, Figure 15 is a section on line 15—15, Figure 1, Figure 16 is a bottom plan of the transmission, Figure 17 is an elevation from the left of Figure 1 with several of the parts removed, Figure 18 is a fragmentary section on line 18—18 of Figure 6, Figure 19 is a side elevation of the piston employed for shifting the motor element, Figure 20 is a top plan view of the piston shown in Figure 19, Figure 21 is a section on line 21—21, Figure 7, Figure 22 is an elevation looking towards the inner face of an end support, Figure 23 is a section on line 23—23, Figure 24 is a perspective view illustrating the form of each of the hangers forming elements of the apparatus, Figure 25 is a side elevation of the operating shaft of the apparatus, Figure 26 is an end view of the shaft shown in Figure 25, Figure 27 is a fragmentary section taken on line 27—27 Figure 26, Figure 28 is a view similar to Figure 25 of the power transmitting shaft of the apparatus, Figure 29 is an end view of the power transmitting shaft, Figure 30 is a fragmentary section on line 30—30, Figure 29, Figure 31 is a fragmentary section on line 31—31, Figure 2, Figure 32 is a fragmentary section illustrating the drive for the operating means of the fluid pump, and Figure 33 is a sectional plan illustrating the coupling block forming an element of the suspension for the motor unit.

Figure 1 of the drawings illustrates in side elevation a hydraulic transmission mechanism, in accordance with my invention. The transmission includes two units of like construction which are shown, one to be driven continuously in one direction, acting as a variable volume pump, the other acting as a variable speed motor, capable of being driven in either direction by a hydraulic coupling with the pump unit through a transfer valve such as will be described.

This transmission is adapted to be interposed between a driving means or source of power and a driven member or machine in which it is desired to vary the ratio of speed and torque or make reversals with the prime mover operating continuously in one direction. It is also adapted to be controlled by varying the crank throw in both the pump and motor, this control being so constructed that after the pump has been moved into its full throw range in either direction, it will be followed up with a shortening of the motor crank throw which will give a further increase in speed at the sacrifice of torque, but should be limited to a two to one overdrive.

The mechanism includes a horizontally disposed rectangular platform or support 1 which is mounted at its sides on a pair of spaced vertically disposed parallel side members 2, 3 of skeleton form. Each side member is provided at the top of its inner face with spaced parallel inwardly extending lugs 4 and at the bottom of its inner face with spaced inwardly extending lugs 5. The platform 1 is secured to the lugs 4 by the holdfast means 6. The members 2, 3 are seated at their lower ends on the bottom of a hydraulic fluid reservoir, in the form of an open top rectangular tank or pan 7 of the desired height and which is anchored to the lugs 5 by the holdfast means 8 (Figure 16). The tank 7 extends from the front, back and outer sides of the members 2, 3.

The platform 1 is provided lengthwise thereof with a slot 9 (Figure 2) which has its front and rear edges spaced equi-distant from the front and rear edges of the platform. The side edges of the slot 9 are spaced equi-distant from the side edges of the platform. The latter has its side marginal portions formed with tubular bearing seats, as indicated at 10, 11, and which are split transversely at their tops. The seats 10, 11 at their outer ends are flush with the other side edges of platform 1. Positioned within the seats 10, 11, anchored by the holdfast means 12 against the outer side face of and extended outwardly from the members 2, 3 respectively are flanged bearings 13, 13ᵃ respectively.

The operating shaft of the apparatus, (Figure 1) is indicated at 14 and operates a driving connection 15 for a gear pump 16 which is associated with a pump or hydraulic pressure generator unit 17. A power transmitting shaft is indicated at 18 and is operated from a motor unit 19. The operating shaft 14 is driven by any suitable means, which by way of example, is shown as a pulley 20 having an elongated hub 21 keyed on shaft 14 and abutting collar 13.

The driving connection 15 is of the spiral gear type and is employed for operating the driving means 23 of the gear pump 16 submerged in the reservoir aforesaid, which is secured to and depends through the bottom of tank 7. The pump 16 discharges hydraulic fluid through the pipe 25 (Figure 16) to the bottom of a filter 16ᵃ, suitably connected to tank 7. The filter is to be provided at its top with a pressure relief valve which returns the surplus fluid to the reservoir and also carries off any air bubbles that might be in the fluid. Leading from the filter, not shown, is a supply line 26 which opens into a fluid distributor valved block 27 common to the units 17 and 19.

The block 27 (Figures 7, 15 and 21) includes an intake port 28 into which the supply line 26 opens. The block 27 is formed with a vertically disposed duct 29 opening at its lower end into the port 28 and below its upper end into a channel 30 which is disposed at right angles to the duct 29. The upper end of the latter is closed by a plug 31. The block 27 is formed with a pair of spaced parallel chambers 32, 33 between which extends the duct 29. The block 27 in proximity to its bottom is provided with a pair of recesses 34, 35 arranged below the chambers 32, 33 respectively. The recesses 34, 35 communicate with the port 28. The block 27 is formed with a pair of spaced vertically disposed openings 36, 37 which are intersected by the recesses 34, 35 respectively and connect the chambers 32, 33 with the recesses 34, 35 respectively. Plugs 38, 39 are secured in the lower ends of the openings 36, 37 respectively and constitute stops for the spring controlled relief valves 40, 41 slidably mounted in the openings 36, 37 respectively and extending into the chambers 32, 33. Each relief valve consists of an inverted cup-shaped body part 42 formed at its top with an axial opening 43 which has its wall registering with the inner face of a tubular stem 44 integral with the top of body part 42. The stem 44 intermediate its ends is provided with a seat 45 for a globular check valve 46. The stem 44 is so formed whereby the inner face of its upper end will align with a vertical outlet port. The outlet ports are indicated at 47, 48 and open at their inner ends into the chambers 32, 33 respectively. The relief valves 40, 41 include controlling springs 49, 50 each of which is interposed between the top of the body part 42 of the valve and a stop 38 or 39. The springs normally maintain the stems of the relief valve against the top wall of the chambers 32, 33 such as shown in Figure 7. The block 27 includes a pair of spaced ducts 51, 52 open at their inner ends and plugged at their outer ends and which communicate with the chambers 32, 33. The ducts 51, 52 are arranged below the channel 30. The valves 40, 41 are of the hollow piston type and are normally seated such as shown in Figure 7.

Communicating with the ports 47, 48 are fluid conducting pipes 53, 54 respectively for a purpose to be referred to. Communicating with the channel 30 is a pair of fluid conducting pipes 55, 56 (Figure 15) for a purpose to be referred to.

The pump unit 17 includes a pair of oppositely disposed inwardly opening parallel rings 57, 58 of channel shape cross section for suspending a circular row of spaced radially disposed cylinders 59 open at their inner ends and having their sides provided with rollers 60 mounted in the rings 57, 58. Operating in each cylinder 59 is a tubular piston 62. The pistons are fixedly secured at their inner ends to and radially disposed with respect to a revoluble tubular shaft 63 provided between its inner and outer faces with a set of angle-shaped fluid channels 63a opening at their outer ends into the inner ends of the pistons 62.

The motor unit 19 includes a pair of oppositely disposed inwardly opening parallel rings 64, 65 of channel shaped cross section suspending a circular row of spaced radially disposed cylinders 66 open at their inner ends and having their sides provided with rollers 67 mounted in the rings 64, 65. Operating in each cylinder 66 is a tubular piston 68. The pistons 68 are fixedly secured at their inner ends to and radially disposed with respect to a revoluble tubular shaft 69 provided between its inner and outer faces with a set of angle-shaped fluid channels 70 opening at their outer ends into the inner ends of the pistons 68. When the pump unit 17 and the motor unit 19 are arranged in relation the inner ends of the passages 63a align in spaced relation with respect to the inner ends of the passages 70.

The shafts 63 and 69 are of like form, but are oppositely disposed and each (Figure 18) includes an inner portion 71 and an outer portion 72 corresponding in outer diameter to that of the portion 71. Each shaft also includes an intermediate portion 74 of greater outer diameter than the portion 71. The portion 74 is provided in its outer periphery with threaded sockets 75 for the tubular pistons 62 or 68. The portion 72 is of greater inner diameter than the portions 71, 74. The inner diameter of the portions 71, 74 are the same.

The portion 72 of the shaft 63 is formed in its outer edge with coupling teeth 76. The portion 72 of the shaft 69 is formed in its outer edge with coupling teeth 77. Secured upon the outer face of the portion 72 of the shaft 63 adjacent the teeth 76 is an annular cage 78 provided with bearing balls 79. Secured upon the outer face of the portion 72 of the shaft 69 adjacent the teeth 77 is an annular cage 80 provided with bearing balls 81.

The apparatus includes a pair of vertically disposed outer supports 82, 83 of like form, but which are oppositely disposed, extend through the slot 9 and are anchored to the platform 1. With reference to Figures 22 and 23 each support consists of a tapered upper part 84, a flared lower part 85 merging at its upper end into the lower end of the part 84. Integral at the point of mergence of the parts 84, 85 are oppositely disposed apertured lugs 86, 87 rabbeted, as at 88. The lugs 86, 87 seat on the platform 1 and also seat against the front and rear edges of the slot 9. Holdfast means 89 are employed for anchoring the lugs 86, 87 to the platform 1. The upper end of part 84 has a circular enlargement 90 formed with an axial opening 91. The bottom of the part 85 is formed with a rib 92 having an arcuate central portion 93 and a pair of oppositely disposed enlarged circular horizontal portions 94, 95 which may be termed lugs and each of which is formed with a vertical opening 96 axially thereof having a portion of its wall rabbeted, as at 96a. Each of said supports is formed with an enlarged opening 97 substantially centrally thereof and annular flanges 98, 98a forming flush continuations of the opening. Secured in the rabbeted portion 96a of the wall of opening 97 and to the inner face of the flange 98 is a bearing member 99.

The portion 72 of shaft 63 extends into the opening 97 in the support 82 and is coupled to the operating shaft 14 whereby the latter when driven will operate the shaft 63. The shaft 14 at its inner end is provided with an enlarged tubular portion 99a merging at its outer end into a circular disc 100 formed with radially disposed spaced notches 101 which receive and coact with the teeth 76 formed on the portion 72 of the shaft 63 for coupling shafts 14, 63 together in a manner to provide for shaft 63 being driven from shaft 14. The portion 72 of shaft 63 encompasses the portion 99a of shaft 14. The bearing balls 79 on portion 72 of shaft 63 have seated thereon the bearing member 99 carried by the support 82. The shaft 14 is mounted in the bearing means 13 and includes a collar 101a which is of less diameter than and is integral with disc 100.

The power transmission element 18 includes a shaft 102 operated from the unit 19 and is shown as having a transmission means 103, shown by way of example, as a pulley. The shaft 102 is mounted in the bearing means 13a and extends into the opening of the support 83. The shaft 102 consists of an outer part 104, an intermediate part 105 of greater diameter than the part 104 and an inner part 106 of greater diameter than the part 105. The part 106 at its outer end is formed on its periphery with a circumferentially extending row of radially disposed spaced lugs 107 which form with the shaft 102 what may be termed spaced notches. The portion 72 of the shaft 69 is seated on the portion 106 of the shaft 102 and the teeth 77 of portion 72 of shaft 69 engage in the notches formed by the lugs 107 to provide for shaft 69 to couple with shaft 102 for the purpose of driving the latter. The bearing balls 81 on shaft 69 have the bearing member 99 of the support 83 bear thereon.

There is associated with the pump unit or generator 17 a pair of oppositely disposed hangers 108, 109 of like form. There is associated with the motor unit 19 a pair of oppositely disposed hangers 110, 111 of like form. Each of said hangers includes an annular body part 112 formed at its top with a tapered extension 113 having its upper end provided with an opening 114. Depending from the bottom of body part 112 is a flared extension 115 formed at its lower end with an opening 116. The body part 112 is offset with respect to the extensions 113, 115. The upper end of extension 113 and lower end of extension 115 are of greater thickness than the remaining portion of the hanger and such ends are of circular form. Secured to the inner edge of the annular body part 112 is an inwardly extending collar 117 having secured upon its outer face an annular cage 118 provided with spaced bearing balls 119.

There is associated with the hangers 108, 109 a rockable suspension bar or rod 120 therefor. There is associated with the hangers 110, 111 a rockable suspension bar 121 therefor. The bar 120 is of circular cross section and is formed of a central part 122, a pair of intermediate parts 123, 124 of less diameter than the part 122 and a pair of outer parts 125, 126 of less diameter than the parts 123, 124. The outer terminal portion of the periphery of each of the intermediate parts is provided with threads 127. The bar 121 is of circular cross section and is formed of a central part 128, a pair of intermediate parts 129, 130 of less diameter than the part 128 and a pair of outer parts 131, 132 of less diameter than the intermediate parts. The outer terminal portion of the periphery of each of the intermediate parts is provided with threads 133.

The upper ends of the extensions 113 of the hangers 108, 109 are mounted on the intermediate parts 123, 124 of bar 120 and abut the central part 122 of the latter. Holding nuts 134 engage with the threads 127 on the intermediate parts 123, 124 and abut the upper ends of the extensions 113. The outer part 126 of the bar 120 extends into the opening 91 of the upper end of the part 84 of the support 82 and the said upper end of part 84 provides a bearing for the outer part 126 of bar 120. The bearing for the outer part 125 of bar 120 will be presently referred to. The bearing balls carried by the hangers 108, 109 have the inner edges of the rings 57, 58 of the unit 17 bear thereon.

The upper ends of the extensions 113 of the hangers 110, 111 are mounted on the intermediate parts 129, 130 of bar 121 and abut the central part 128 of such bar. Holding nuts 135 engage with the threads 133 on the intermediate parts 129, 130 of bar 121 and abut the upper ends of said extensions. The outer part 131 of the upper bar 121 extends into the opening 91 of the upper end of the part 84 of the support 83 and the said upper end of the part 84 provides a bearing for the outer part 131 of bar 121. The bearing for the outer part 132 of bar 121 will be presently referred to. The bearing balls carried by the hangers 110, 111 have the inner edges of the rings 64, 65 of the unit 19 bear thereon.

The unit 17 is arranged between the body part of the hangers 108, 109. The unit 19 is arranged between the body part of hangers 110, 111. Arranged between the extensions 115 of the hangers 108, 109 is a spacer block 136 which is pivotally mounted upon a headed bolt 137 seated in the openings 116 and secured to said extensions by a holding nut 138. Arranged between the extensions 115 of the hangers 110, 111 is a spacer block 139 which is pivotally mounted upon a headed bolt 140 seated in the openings 116 of such extensions and secured to said extensions by a holding nut 141. The bolt 137 connects the lower ends of the hangers 108, 109 together. The bolt 139 connects the lower ends of the hangers 110, 111 together.

A stationary fluid flow control structure 142 (Figures 6 and 7) is interposed between the hangers 109 and 110 to provide for the continuous flow of fluid between units 17 and 19 when these latter are shifted laterally with respect to the axis of the shaft 14. The structure 142 also functions for another purpose to be referred to. The structure 142 includes a body part 143 which oppositely tapers from its transverse median to its ends 144, 145. The end 144 is enlarged, of circular contour and formed with an axial opening 146 into which the inner parts 125, 132 of bars 120, 121 respectively extend whereby the end 144 of body part 143 provides a bearing which is common to said inner parts 125, 132. The structure 142 depends through the slot or opening 9 and is formed substantially centrally thereof with oppositely disposed laterally extending apertured lugs 147, 148 which seat on and are anchored to platform 1 by the holdfast means 149. The body part 143 centrally thereof is formed with an enlarged circular opening 150 having its wall cut out at diametrically spaced points to form pockets 151, 152 inwardly adjacent the side faces of body part 143. The latter is provided with an upstanding angle-shaped channel formed of upper and lower branches 154, 155 respectively disposed in angular relation. The branch 155 at the lower portion of one side thereof opens into the pocket 151 and is closed at its upper end by a plug 151ª. A tubular coupler 156 is secured in body part 143 and opens into the lower end of branch 154. A tubular coupler 156ª is secured in body part 143 and opens into pocket 152. The pipe 53 is a fluid supply means and opens into the coupler 156. The pipe 54 is a fluid return means and opens into the coupler 156ª.

Arranged within the opening 150 of body part 142 is a stationary laminated fluid flow transfer element or valve of circular form and which includes a core 157, an inner band 157ª encompassing snugly core 157, an intermediate band 158 snugly encompassing band 157ª and an outer band 159 snugly encompassing the band 158 and snugly bearing against the wall of opening 150. The core and bands are secured together to prevent their revolving relative to each other and to body part 143 by a retaining member 160 having threaded engagement with body part 143 and extending into opening 150, through the bands and engaging in the core. The member 160 is arranged below the lugs 148 and is removably secured in position. The bands are formed with openings 161 for the passage and the core is formed with a socket 162 to receive the inner end of member 160. At diametrically opposed spaced points of the flow transfer element, the bands are formed with groups of sets of spaced aligning openings. The openings of one of the groups are indicated at 163 and the openings of the other group at 164. The group of sets of openings 163 communicate at the outer end of the group with the pocket 151 and at the inner end of the group with a large fluid passage 165 which is formed in the core. The group of sets of openings 164 communicate at the outer end of the group with the pocket 152 and at the inner end of the group with another large fluid passage 166 formed in the core and spaced from the passage 165. The passages 165, 166 are disposed in spaced inner sidewise aligned relation, of arcuate contour and oppositely disposed. The band 159 may be termed the body part of the transfer element and the core 157, band 157a and band 158 coacting to provide a partition within the said body part to form the transfer element with a pair of oppositely disposed outer open end compartments for receiving shafts 63, 69 in a manner to be referred to. Although the transfer element is shown as consisting of a series of annular parts and a circular part, yet it is to be understood that it may be set up as a one-piece body. The core axially thereof is formed with an opening 167.

The band 159 is of greater width than the core 157 and bands 157a, 158. The edges of the band 159 are flush with the side faces of body part 143. The edges of the bands 157a, 158 and the sides of the core are flush. The core 157, band 157a and band 158 are spaced inwardly adjacent the side faces of body part 143.

The shafts 63, 69 at their inner ends extend into the band 159 and abut the sides of the core 157 and the edges of the bands 157a, 158. The inner ends of certain of the channels 63a, 70 register with the passage 165 and the inner ends of the other of the channels 63a, 70 register with the passage 166. The passages 165, 166 permanently establish communication between the channels 63a and the channels 70.

The shafts 63, 69 are connected together and to the structure 142 by a headed threaded bolt 166a extending through opening 167 in core 157 and through the portions 71, 74, of shafts 63, 69 and into the portions 72 of said shafts. The head of bolt 166a bears against the tapered cutout part 166b at the outer end of the portion 74 of shaft 63. The bolt 166a carries a holding nut 166c arranged within the portion 72 of shaft 69. Mounted on bolt 166a inwardly of nut 166c is a cage 166d carrying bearing balls 166e which bear against the wall of the cutout portion 166f at the outer end of the portion 72 of shaft 69. The bolt 166a is fixed to shaft 63. The shaft 69 revolves about bolt 166a.

There is associated with the unit 17 a shifting mechanism or hydraulic pressure operated follow up control intensifier 168 for moving the rings 57, 58 of such unit in unison off center in opposite directions. There is associated with the unit 19 a shifting mechanism or hydraulic pressure operated follow up control intensifier 168a for moving the rings 64, 65 of such unit in unison off center in one direction. The said shifting mechanisms may also be termed hanger adjusting means or hydraulic intensifiers and are referred to in the claims as hydraulic pressure operated valve-controlled adjusting means or structures. The said mechanisms are of like form, with this exception that each includes a horizontally disposed piston formed with a transverse groove opening at its top, but the groove in the piston 169 of the mechanism 168 is positioned, with respect to the length of piston 169 at a different point than the position of the groove of the piston 170 of the mechanism 168a with respect to the length of the piston 170. The groove in piston 169 is indicated at 171 and the groove in piston 170 at 172. The groove 171 is arranged at the transverse center of piston 169. The groove 172 is arranged between the transverse center and one end of piston 170.

The mechanisms 168 and 168a each include a pair of spaced endwise aligned cylinders 173, 174 open at their inner ends in which is slidably mounted the piston of the mechanism. The piston is cut away at each side to form it with a reduced intermediate portion 175 which is of greater length than its end portions 176. The reduced portion 175 of piston 169 is arranged between the lower ends of the hangers 108, 109 and has seated in its groove 171 the spacer block 136. The reduced portion 175 of the piston 170 is arranged between the lower ends of the hangers 110, 111 and has seated in its groove 172 the spacer block 139. Each piston is formed below the bottom of its groove with an opening 177 extending from end to end thereof. Secured within opening 177 at each end thereof is a closure block. These blocks are indicated at 178, 179 and constitute cut-offs and stops for a purpose to be referred to. Each piston is formed with a pair of oppositely extending spaced endwise aligning ducts 180, 181 lengthwise thereof opening at its ends. Each piston is formed with a pair of spaced parallel vertical ducts 182, 183 which are closed at their upper ends by the plugs 184, communicate at their lower ends with the opening 177 and intermediate their ends with the inner ends of the ducts 180, 181. Each piston is provided with an exhaust port 185 which leads from the opening 177 to its top. Each piston centrally of its bottom is cut out, as at 186 to provide a clearance for a purpose to be referred to.

The cutout 186 communicates with the opening 177. The latter has slidably mounted thereon a combined fluid controlling and conducting valve element 187 formed in its top with a groove 188 lengthwise thereof which associates with a part of the top of the wall of opening 177 to form an exhaust conducting passage opening into the lower end of port 185. The groove 188 is of less length than and has its ends spaced from the ends of element 187. The latter is provided with a fluid conducting channel 189 which extends from end to end thereof. The element 187 centrally of its bottom is formed with an opening 190 communicating with the channel 189. Secured to element 187, extending into the opening 190 and seated in a mortise 191 formed in the bottom of element 187 is a fluid supply element 192. The latter depends from element 187 and has a part of its head 193 arranged in and is of less length than cutout 186 in the bottom of the piston. The element 192 includes a stem 194 and a port 195 which extends from a point above the bottom of stem 194 through the head 193 and opens into the channel 189. Surrounding the stem 194 is a sleeve 196 formed with a pair of oppositely extending arms 197, 198. The stem 194 is formed with a port 199 which opens into the lower end of the port 195. The arm 198 is tubular and constitutes a fluid conductor and has its inner end communicating with the port 189. The arm 197 has secured to its outer end an extension 200 formed with a globular end 200a for a purpose to be referred to.

The cylinders 173, 174 are connected together by a pair of horizontally disposed oppositely extending U-shaped arms 201, 202 which are offset with respect to said cylinders. The arm 201 at its corners is formed with vertical openings 203. The arm 201 centrally thereof is formed with a vertical opening 204. The arm 202 centrally thereof is formed with a vertical opening 205.

Suspended from the arm 201 is a combined support and check valve housing 206 consisting of a hanger 207 extending upwardly through the opening 204 and carrying a binding nut 207a which bears against the top of arm 201. The lower end of the hanger 207 merges into the closed top 208 of a tubular member 209 which constitutes a check valve housing. The member 209 is open at its lower end and has its closed top 208 provided with a positioning pin 210. The member 209 is formed in one side with a fluid outlet 211. The member 209 at its lower end is formed with a laterally extending annular flange 212. The member 209 is formed therein near its upper end with a valve stop 213. There is associated with the member 209 a tubular coupling nipple 214 provided intermediate its ends with a peripheral polygonal shaped flange 215. The nipple 214 consists of an outer peripherally threaded tubular part 216 and a tubular inner part 217 of less outer diameter than the outer part 216. The part 217 has an enlarged portion 218 which threadedly engages the inner face of the member 209. The other portion of the part 217, indicated at 219, is spaced from the inner face of the member 209. The part 219 at its upper end is provided with a valve seat 220 for check valve 221 of globular contour. The flange 215 on the nipple 214 abuts the flange 212 on the member 209.

The arm 198 which extends from the sleeve 196 has formed integral with its outer end a sleeve 223. The arm 198 opens into the sleeve 223. The latter encompasses the member 209 and seats on the flange 212. The sleeve 223 revolves about the member 209 and fluid from the member 209 passes therefrom into the arm 198 and is conducted to the element 187 and from there into the opening 177. The nipple 214 of the mechanism 168 opens into the pipe 55. The nipple 214 of the mechanism 168ª opens into the pipe 56. The pipes 55, 56 extend from the valve distributor block 27 and have threaded engagement with the parts 216 of the nipples 124 of the mechanisms 168, 168ª. The arm 201 of the mechanism 168 is secured to the lower end of the support 82 by the holdfast means 224 extending through the openings at the lower end of the support 82 and the openings at the corner of the arm. The arm 201 of the mechanism 168ª is secured to the lower end of the support 83 by the holdfast means 225 extending through the openings at the lower end of the support 83 and the openings at the corner of the arm.

There is associated with the mechanism 168, 168ª a control mechanism 226 for the valve elements 187 for controlling the direction of shift of the pistons 169, 170 in opposite directions by the fluid for adjusting the positions of the units 17, 19. The mechanism 226 includes an upstanding support 227 secured to the front of pan 7 and which is formed at its upper end with a bearing 228 in which is mounted a rock shaft 229. The latter extends from each end of bearing 228 and has fixed on an end terminal portion thereof a handle 230. Secured on the other end terminal portion of the shaft 229 is the sleeve 231 which is secured to one face of a disc 232 axially of said face. The sleeve 231 abuts against the bearing 228. The disc 232 is formed with a pair of pins 233 and 234 disposed in spaced relation a distance substantially 90 degrees with respect to the disc. The pins are arranged in close proximity to the edge of the disc. The pin 233 extends from one face of the disc and the other pin 234 from the other face thereof. The pins have globular outer ends as indicated at 235, 236. The head of pin 235 and the head of pin 236 each extend into a sleeve and the said sleeves are indicated at 237, 238. The pins are universally connected to their sleeves and the structural arrangement to provide such connection is shown in Figure 14 with respect to pin 233. The sleeve 237 has a tapered end portion 239 of greater thickness than its remaining portion 240. The portion 239 is internally threaded and such portion provides the sleeve with an internal shoulder 241. The portion 240 of sleeve 237 has one side formed with an elongated slot 242. Threadably engaging with the interior of the portion 240 at one end thereof is a plug 243 having its inner end formed with a concave recess 244. The plug 243 for a portion of its length is slotted, as at 245, and extending through the slot, as well as through the portion 240 is a holding pin 246 for plug 243. Arranged within the portion 240 of sleeve 237 is a plunger having a head 247 provided with a concave recess 248 which opposes the recess 244 and is oppositely disposed with respect thereto. The head 235 of the pin 233 seats in the recess formed in the plug and plunger whereby the pin 233 is universally connected to the sleeve 237. The plunger includes a reduced stem 249 and surrounding the latter and interposed between the shoulder 241 and head 247 of plunger is a coil controlling spring 250 which functions to normally maintain the end 235 of pin 233 yieldably seated in the recesses. The pin 234 is mounted in its sleeve 238 in the same manner as the pin 233 is mounted in its sleeve 237.

Connected to the portion 239 of the sleeve 237 is a control or shifting rod 251 leading to the unit 17 and which has mounted thereon a holding nut 252 which bears against the portion 239 of sleeve 237. The outer end of the rod 251 has threadable engagement with the portion 239 of the sleeve 237. The rod 251 is connected to the inner end of sleeve 237. The plug 243 is arranged in the outer end of the sleeve 237.

Connected to the portion 239 of the sleeve 238 is a control or shifting rod 253 leading to the unit 19 and which has mounted thereon a holding nut 254 which bears against the portion 239 of sleeve 238. The rod 253 has threadable engagement with the portion 239 of the sleeve 238. The outer end of the rod 253 is connected to the inner end of sleeve 238. The plug 243 is arranged in the outer end of the sleeve 238.

The extension 200 on the arm 197 of the mechanism 168 is connected with the inner end of the rod 251 in the same manner as the pin 233 is connected with the outer end of the rod 251.

The extension 200 on the arm 197 of the mechanism 168ª is connected with the inner end of the rod 253 in the same manner as the pin 234 is connected with the outer end of the rod 253.

As before stated, the pistons 169, 170 are of the same form with the exception as to the position of the grooves 171, 172. The groove 171 being at the center of piston 169 for the pump or generator unit 17 allows the travel to be of equal limits each side of the center, giving forward or reverse pumping action with variable volume in proportion to the length of movement. The groove 172 being adjacent or offset relative to one side of the transverse median of the piston 170 for the motor unit will not carry the motor unit 19 across center. The piston 170 is connected to the control so that it keeps the motor unit 19 in a full throw position until the piston 169 has moved to full throw either side of center. Any further movement of the control will pull the motor unit 19 towards center reducing the throw and causing a further increase in speed. With reference to Figure 17 the control or shifting rod 251 to the pumping or generating unit 17 is at full movement of the crank disc while the control or shifting rod 253 to the motor unit 19 is on dead center. This is the neutral point of the control. The transmission is never brought to zero stroke position.

When the pumping unit 17 is centered it has no discharge. When the motor unit 19 is in full throw but standing dead, it is receiving no fluid from the pump. Any movement of the control in either direction will cause a throw in the pump unit 17 and the latter will discharge forward or reverse accordingly into the unit 19 producing rotation in proportion to the movement of control. Upon continued movement of control, the pump unit control rod will go into dead center and the motor unit control rod will come into full movement. No matter in which direction one moves the control, a continued movement will reduce the motor volume causing a further increase in speed.

Any movement of the throw control piston for unit 17 will swing the unit and move the rings 57, 58 in unison off center or eccentric with respect to shaft 63. This statement applies to the motor unit 19 as the rings 64, 65 will be moved off center or eccentric with respect to shaft 69 when the throw control piston for the element 19 is moved. With respect to each unit when revolving, the pistons and cylinders thereof will travel around different centers causing the cylinders to move in and out on the pistons in each revolution or if connected in a hydraulic circuit they will receive fluid one-half of a revolution and discharge the other half.

With reference to Figure 1, it will be assumed that the operating shaft 14 is connected with and driven from a source of power and which in turn will operate the unit 17, as shaft 14 is connected to the latter. The shaft 14 will also operate the driving connection 15 for the pump 16 and on the operation of the latter it provides for the fluid to be supplied to the valve distributor block 27. The fluid enters block 27 at port 28, passes up through duct 29 into the channel 30 and from the latter into the lines 55, 56 which open respectively in the mechanisms 168, 168ª whereby the fluid is supplied to the elements 167 of said mechanisms and from said elements into the cylinders for pistons 169, 170. When the fluid enters an element 167, it may discharge from either end thereof into a cylinder 173 or 174, depending upon the position of element 187 relative to ports 182, 183. If the element 187 is moved to the left, the ports 182, 183 will be opened and will cause the cylinder 173 to communicate with the atmosphere through port 185. The fluid then can pass through ports 183, 181 and fill the cylinder 174 at one end of the piston.

Now with reference to piston 169, the pressure of the fluid in cylinder 174 will move piston 169 in a direction towards cylinder 173 until the ports 182, 183 are again closed. In this manner the piston 169 will follow the element 187 in any direction in which the latter may be moved, and an equal distance, and it will not change its location independent of element 187.

A movement of the piston 169 swings the lower end of the hangers 108, 109 which carry the rings 57, 58 therewith whereby these latter will swing off center and cause the cylinders 59 to travel in an eccentric path in relation to the pistons 62. A similar operation is had when a shift is given to the piston 170, that is to say, the latter swings the lower end of the hangers 110, 111 which carry the rings 64, 65 therewith whereby these latter will be swung off center and cause the cylinders 66 to travel in an eccentric path in relation to the pistons 68.

With reference to Figure 18, it will be assumed that the unit 17 is being driven by some source of power and the control therefor is in its forward position, the cylinders of the unit, due to the action of piston 169 will run eccentrically to the pistons of the unit. Cylinder A of unit 17 will be driven inwardly on piston B. This will cause a discharge through channel C, through passage D, through channel E, through piston F of unit 19 and act on cylinder G of unit 19 which is in full throw or eccentric position. This action causes unit 19 to rotate. The fluid being received in one-half revolution is carried around and is discharged through channel H, through passage I, through channel J and into the unit 17.

Moving the control into reverse, throws the unit 17 off to the opposite side of center causing it to discharge at channel J and to drive the unit 19 in the opposite direction. The unit 17 discharges a volume in proportion to the distance it is taken off center and in this manner gives a variable speed to the unit 19 in either direction. The control is so arranged that after the unit 17 has reached its maximum throw in either direction, continued movement of the control acts on the piston 170 of the unit 19 moving the latter towards center. This has the effect of shortening the stroke or reducing the volume of the unit 19 giving a further increase of speed at a sacrifice of torque.

With reference to Figure 7, when the transmission is in operation with the unit 19 running in the forward direction, the unit 17 will be discharging fluid through the passage D (Figure 18) with a pressure which is in proportion to the load being driven by the unit 19. This pressure acts back through the ducts to the valved distributor block 27 holding the ball valve 46 of the relief valve 40 on its seat to prevent further escape of fluid, while the ball valve 46 of the relief valve 41 allows fluid to pass to passage 166 for a leakage make-up, as said passage communicates with the return or suction side of unit 17. If the control is moved into reverse, the passage 166 will become the pressure port holding valve 46 of relief valve 41 on its seat and the make-up fluid will pass valve 46 of the relief valve 40. Should the unit 19, running in a forward direction with the pressure acting to hold valve 46 of the relief valve 40 on its seat, become overloaded the pressure will rise to a point where the valve 40 will be unseated, the pressure will enter chamber 32 and pass through the ducts 51, 52 into the chamber 33, having entered there the pressure will act simultaneously on the larger diameter of the relief or overload valves 40, 41, thereby compressing the springs 49, 50 and drive said valves against the stops 38, 39. This allows for a circulation of the fluid from the pump to pass through the pipes 53, 54 with the unit 19 standing stationary. Upon moving the control to the center or neutral position, the valves 40, 41 will close ready for operation when the overload is removed from unit 19. This overload action will operate in either forward or reverse direction of operation of unit 19.

The arms 202 of the mechanisms 168, 168ª are detachably connected to the body part 143 of the structure 142 by spaced holdfast means 254ª carried by the lower end of body part 143 and extending through the openings 205 in arms 202.

The band 159 of the laminated fluid flow controlling element carries bearings means 255 for the inner ends of the shafts 63, 69.

The pump or generator unit 17 and the motor unit 19 each includes what may be termed a circular gang of radially disposed tubular pistons bodily travelling in a circular path and a circular gang of radially disposed spaced cylinders bodily travelling in a circular path and slidably mounted on the pistons of the gang. The pistons are connected to a revoluble shaft. The cylinders of the gang carry means for slidably suspending them from a pair of oppositely disposed channeled shaped rings and with the latter mounted on bearings supported by a pair of adjustable hangers coacting, when adjusted with the pair of rings for disposing the axis of the gang of cylinders offset with respect to the axis of the gang of pistons whereby the path of travel of the cylinders will be disposed in eccentric relation with respect to the path of travel of the pistons.

The improved form of cylinder is shown in detail at 59, Figures 11, 12 and 13. This form of cylinder is unlike the conventional form now employed and has a square outside which is closely fitted between the cylinder retaining rings 57 and 58 Figure 13, keeping the two integral oppositely disposed roller journals at right angles to the retaining rings 57 and 58, thus eliminating the necessity for any cross heads or other guiding means. The elimination of cross heads or other guiding means enables the retaining rings as shown at 57 and 58 Figure 18, to be greatly reduced in diameter, allowing the cylinder heads to extend well beyond into the open for heat dissipation. The greatest temperature rise in hydraulic transmissions of this class occurs in the cylinder chambers, therefore, it is important to keep the chambers as far removed from the masses as possible. The retaining rings 57 and 58 are journaled on the bearings 119 and rotate bodily with the cylinders as one mass. The rollers 60 do not roll continuously in the retaining rings but have only an oscillating movement to compensate for uneven cylinder spacing when the cylinders are travelling a circular path that is eccentric to the common center of the unit. The bearings 119 are fixed in the hangers 108 and 109 for the pump. The motor unit has the same construction, the hangers are shown at 110 and 111, the upper portion of these hangers are fixed to the pivot shafts 120 and 121. The lower portions of the hangers for the generating or pump unit and for the motor unit terminate on the control intensifiers 168, 168ᵃ, which have the ability to change the stroke of the cylinders at the will of the operator by swinging the hangers. The control intensifiers 174 are actuated through the means heretofore referred to. The intensifiers impart the movement of the actuating rods to the cylinder hangers. The control rod 251 is connected to the pump stroke control actuating means and to the live center of the rock shaft disc 232, in this position the control is holding the pump unit on center or its neutral point so that it will not discharge any fluid to the motor in either direction. The control rod 253 is connected to the motor stroke control actuating means and the dead center of the rock shaft disc 232, in this position the control is holding the motor unit in full throw position, ready to give maximum torque for any fluid received from the pump. By referring to Figure 17 it can be readily understood that any movement in either direction given the rock shaft disc 232, will have an immediate effect on the pump control, but due to the fact that the motor control is on dead center it is not immediately effected, but a continued movement in either direction will have the same effect of shortening the motor stroke, which should be limited at a point where the displacement of the motor is one-half that of the pump.

When operating a hydraulic transmission such as described, it is necessary to have a device or structure which includes a fluid by-pass channel incorporating an overload valve, introduced into the hydraulic circuit, which will by-pass the discharge from the pump in case of a sudden overload. This device which has been heretofore described also acts to greatly reduce the fluid pressure in the by-pass circuit, which prevents an undue temperature rise in the fluid before the load can be removed. Figures 7 and 21 show the structure of this device in which the block 27 is the body of the device incorporating two piston type valves 40 and 41, these valves have an extended stem or seat 44 of a much smaller diameter, within this extension is a ball check valve 46, the purpose of which will be hereinafter described. The conducting pipes 53 and 54 are shown connected at the top of block 27, these pipes also connect into that portion of the housing or frame surrounding the fluid transfer element or valve, as shown in Figure 7, establishing communication between the valves 40 and 41 and the transfer ports 165 and 166, through fluid channels or ports 163 and 164. During the operation of this transmission the transfer ports 165 and 166 constitute the two sides of the hydraulic circuit, namely the high pressure or discharge side from the pump, and the low pressure or return side, neither ports 163 or 164 being specifically the high or low pressure side as the circuit is reversed when the pump throw is moved across center to produce reverse rotation in the motor unit. It is also necessary to feed a small quantity of fluid into the circuit to make up that which is lost through leakage in operation, owing to this fact. I have made the valve block 27 act as a centralized distributing means for the fluid from the pump 16. The outlet 25 from pump 16 leads to the bottom of the filter 16. When the input shaft 14 is being driven there is a continuous flow of fluid into the filter, the unused surplus being returned to the reservoir 7 through the pressure regulating valve, not shown, mounted at the top of the filter so as to carry off all air that might become mixed in the fluid. The primary object of this regulating valve being to maintain a definite working pressure on the fluid within the filter. The working fluid is taken from the bottom of the filter through the fluid supply line 26 connecting into the valve block 27. Referring again to Figure 21 the fluid upon leaving the filter enters valve block 27 at point 28, fluid used in the stroke control intensifier passes upward through fluid channel 29 entering the channel 30, and subsequently enters the conducting pipes 55 and 56 which are connected to the nipples 214. The ball check valve 221 acts to prevent any fluid back surge from the intensifier, after passing this check valve the fluid passes through the outlet 211 into the actuating arm or lever for conducting the fluid to the fluid supply element 192. The fluid enters the intensifier at port 199.

Going back to the fluid intake port 28 in valve block 27, fluid entering here will fill the recesses or chambers 34 and 35 under the piston valves 40 and 41, passing upward through them to the ball valves 46, the ball valve associated with the high pressure port will be held to its seat, while the other will open and allow leakage makeup fluid to pass into the low pressure side of the circuit.

To set forth the action of the overload valves, I will assume that the rotation of the motor unit is such that transfer, passage or port 166, Figure 7 is the pressure passage or port and it was driving a machine in which the operator for some accidental reason or otherwise allowed an overload to occur. The pressure in passage or port 165 will instantly rise to such a point that it will act back through the fluid conducting pipe 53 to unseat the overload valve 40 at point 44. The fluid will enter chamber 32 and pass through the ducts or fluid channels 51 and 52 to chamber 33, at this point the fluid will act on the large diameter of the valves 40, 41 throwing them both wide open allowing the fluid to pass back to transfer passage or port 166, through the conducting pipe 54. Due to the difference of the two diameters on the valves in which the ratio of area is about five to one, the fluid pressure will drop to one-fifth of the original pressure in maintaining an open by-pass channel; this prevents heating of the fluid until the operator can place the pump unit in neutral crank position and remove the cause of overload.

Where hydraulic mechanisms of this class are applied to machine tools, etc., the operator is required to make many changes of speed or reversals of rotation. Due to the force required on the controls in manipulation, the common practice is to use hand wheels and threaded shafts, which are slow and tiresome. To overcome this, I have placed the shifting mechanisms or hydraulic intensifiers 168, 168ᵃ in the control system which furnishes the necessary force to quickly follow up the almost effortless movements of the operator. The hydraulic fluid, under pressure from the pump 16, enters the actuating supply element 192 at the port 199, passing upward through port 195 into channel 189 which emerges from both ends of the element 187, placing it in hydraulic balance. The piston 169 has two fluid channels 180 and 181 which communicate between the cylinder chambers and the opening 177 through channels 182 and 183, but are sealed by the element 187. When forming the groove 188, a mass is left at each end of the element 187, which exactly covers the ducts 182 and 183. If the element 187 is moved endwise, it will put one cylinder chamber in communication with the outside, so that its fluid can be discharged, and the other with opening 177, from which it will receive fluid causing the piston 169 to follow the movement of the element 187 until the fluid ducts 182 and 183 are again closed. This device is also self-locking in that the piston 169 will not move under any force less than enough to overcome the hydraulic fluid pressure unless the element 187 is moved first.

What I claim is:

1. In a hydraulic transmission of that type having a pivotally suspended driven revoluble adjustable hydraulic pressure generating unit, a pivotally suspended revoluble controllable motor unit driven from the pressure generated from the other unit and with each of said units including a shaft formed with fluid channels opening at the inner end thereof, the combination of an upstanding fluid transfer element adapted to encompass the inner terminal portions of said shafts, said element being formed of a stationary body provided centrally thereof and inwardly adjacent to its side faces with a core adapted to be arranged between and against the inner ends of said shafts whereby the latter will be encompassed by said body, said core being formed with a pair of spaced fluid passages of arcuate form for registering with the channels of said shafts, said body being formed with pockets spaced from said core and communicating with said passages, bearings within said body and interposed between the latter and said shafts, pipes opening into said pockets to provide for a circulation of fluid through said element and units, a hydraulic pressure operated adjusting means for and adapted to be connected with the generator unit for selectively controlling the direction of flow through such unit, a hydraulic pressure operated valve-controlled adjusting means adapted to connect with the motor unit for controlling the speed of the latter, a valve-controlled fluid conducting pipe leading to each of said adjusting means, and a fluid distributor adapted to communicate with a source of fluid supply opening into the pipes leading to the pockets of the fluid transfer element and the pipes leading to the pair of adjusting means and being provided therein with valves for controlling the pipes opening into the pockets.

2. In a hydraulic transmission, two spaced pairs of spaced upstanding hangers, independent means for pivotally suspending each pair of hangers from their upper ends, a pivotally mounted spacer block connected with and arranged between the lower ends of each pair of hangers, the hangers of a pair being adjustable in unison, a driven, controllable, bodily revoluble, adjustable hydraulic pressure generating unit carried by a pair of hangers, a bodily revoluble controllable, adjustable hydraulic pressure operated motor unit operated from the pressure generated by the other unit and carried by the other pair of hangers, each of said units including a pair of parallel parts revolubly mounted on and intermediate the ends of the inner sides of a pair of hangers and outwardly and inwardly extending parts passing through and spaced from the body of such pair of hangers intermediate the ends of the latter, the said inwardly extending parts being inner endwise aligned, oppositely disposed and formed lengthwise with fluid channels opening at the inner ends of such parts, a stationary element arranged between and encompassing the inner end terminal portions of the said inwardly extending parts and having an inset core formed with spaced fluid transfer means registering with the said inner ends of the channels, a valve-controlled hydraulic pressure operated adjusting means for and engaging with and shifting the spacer block for the hangers carrying the generator unit for selectively controlling the direction of flow through the latter, a valve-controlled hydraulic pressure operated adjusting means for and engaging with and shifting the spacer block for the pair of hangers for the motor unit for controlling the speed of the latter, and controlling means for said adjusting means.

3. In a hydraulic transmission, a supporting means including a platform provided with a lengthwise slot, a pair of spaced upstanding aligned outer supports anchored intermediate their ends to said platform and depending through said slot, an upstanding stationary fluid flow control structure arranged between, spaced from and aligned with said supports, anchored intermediate its ends to said platform and depending through said slot, a pair of spaced upstanding adjustable hanger-means depending through said slot, a pair of suspensions, each connected to the upper end of a hanger-means for pivotally suspending the latter, each suspension being mounted in a support and in said structure, a driven, adjustable bodily revoluble hydraulic pressure generating unit positioned in said slot, revolubly mounted on and within a hanger-means intermediate the ends of the latter and extended at one side into one side of said structure, a bodily revoluble motor unit operated from the hydraulic pressure generated by the other unit positioned in said slot, revolubly mounted on and within the other hanger-means intermediate the ends of the latter and extended at one side into the other side of said control structure, said hanger-means and units having coacting parts for adjusting the units on the adjustment of the hanger-means for controlling the direction of flow through the generator unit and the speed of the motor unit, said structure having means for establishing communication between said units, a hydraulic pressure operated adjusting means for the hanger-means for the generator unit, a hydraulic pressure operated adjusting means for the hanger-means for the motor unit, the said pair of adjusting means being connected to said structure and supports below said platform, means for controlling the operating of adjusting means, and means for supplying fluid to said pair of adjusting means and said structure.

4. In a hydraulic transmission, a supporting means including a platform provided with a lengthwise slot, a pair of spaced upstanding aligned outer supports anchored intermediate their ends to said platform and depending through said slot, an upstanding stationary fluid flow control structure arranged between, spaced from and aligned with said supports, anchored intermediate its ends to said platform and depending through said slot, a pair of spaced upstanding adjustable hanger-means depending through said slot, a pair of suspensions, each connected to the upper end of a hanger-means for pivotally suspending the latter, each suspension being mounted in a support and in said structure, a driven, adjustable bodily revoluble hydraulic pressure generating unit positioned in said slot, revolubly mounted on and within a hanger-means intermediate the ends of the latter and extended at one side into one side of said structure, a bodily revoluble motor unit operated from the hydraulic pressure generated by the other unit positioned in said slot, revolubly mounted on and within the other hanger-means intermediate the ends of the latter, and extended at one side into the other side of said structure, said hanger-means and units having coacting parts for adjusting the units on the adjustment of the hanger-means for controlling the direction of flow through the generator unit and the speed of the motor unit, said structure having means for establishing communication between said units, a hydraulic pressure operated adjusting means for the hanger-means for the generator unit, a hydraulic pressure operated adjusting means for the hanger-means for the motor unit, the said pair of adjusting means being connected to said structure and supports below said platform, means for controlling the operating of said adjusting means, and means for supplying fluid to said pair of adjusting means and said structure, each hanger means and its associated adjusting means having coacting parts for connecting the lower end of the hanger means to its adjusting means.

5. In a hydraulic transmission, a supporting means including a platform provided with a lengthwise slot, a pair of spaced upstanding aligned outer supports anchored intermediate their ends to said platform and depending through said slot, an upstanding stationary fluid flow control structure arranged between, spaced from and aligned with said supports, anchored intermediate its ends to said platform and depending through said slot, a pair of spaced upstanding adjustable hanger-means depending through said slot, a pair of suspensions, each connected to the upper end of a hanger-means for pivotally suspending the latter, each suspension being mounted in a support and in said structure, a driven, adjustable bodily revoluble hydraulic pressure generating unit positioned in said slot, revolubly mounted on and within a hanger-means intermediate the ends of the latter and extended at one side into one side of said structure, a bodily revoluble motor unit operated from the hydraulic pressure generated by the other unit positioned in said slot, revolubly mounted on and within the other hanger-means intermediate the ends of the latter, and extended at one side into the other side of said structure, said hanger-means and units having coacting parts for adjusting the units on the adjustment of the hanger-means for controlling the direction of flow through the generator unit and the speed of the motor unit, said structure having means for establishing communication between said units, a hydraulic pressure operated adjusting means for the hanger-means for the generator unit, a hydraulic pressure operated adjusting means for the hanger-means for the motor unit, the said pair of adjusting means being connected to said structure and supports below said platform, means for controlling the operating of said adjusting means, and a valve-controlled fluid distributing unit arranged below said platform adapted to communicate with a fluid pump and having means extended therefrom for establishing communication there between and the said pair of adjusting means and the said structure.

EUSTACE LORING ROSE.